United States Patent
Kato et al.

(10) Patent No.: US 9,709,084 B2
(45) Date of Patent: Jul. 18, 2017

(54) CLIP AND ELASTIC BODY ATTACHMENT COMPONENT

(75) Inventors: Masakazu Kato, Osaka (JP); Shinji Muto, Osaka (JP); Kei Akazawa, Tokyo (JP); Yoshimichi Matudaira, Aichi (JP)

(73) Assignees: NITTO DENKO CORPORATION, Osaka (JP); NEWFREY LLC., Newark, DE (US)

( * ) Notice: Subject to any disclaimer, the term of this patent is extended or adjusted under 35 U.S.C. 154(b) by 413 days.

(21) Appl. No.: 14/124,476

(22) PCT Filed: Jun. 5, 2012

(86) PCT No.: PCT/JP2012/064483
§ 371 (c)(1),
(2), (4) Date: Dec. 6, 2013

(87) PCT Pub. No.: WO2012/169499
PCT Pub. Date: Dec. 13, 2012

(65) Prior Publication Data
US 2014/0109358 A1    Apr. 24, 2014

(30) Foreign Application Priority Data
Jun. 8, 2011 (JP) .................................. 2011-128377
May 23, 2012 (JP) .................................. 2012-117839

(51) Int. Cl.
*A41F 1/00* (2006.01)
*F16B 2/22* (2006.01)
(Continued)

(52) U.S. Cl.
CPC .............. *F16B 2/22* (2013.01); *F16B 5/0614* (2013.01); *F16B 21/086* (2013.01); *Y10T 24/44291* (2015.01); *Y10T 29/49826* (2015.01)

(58) Field of Classification Search
CPC ........ F16B 2/22; F16B 21/086; F16B 5/0614; Y10T 24/44291; Y10T 29/49826;
(Continued)

(56) References Cited

U.S. PATENT DOCUMENTS 3,991,960 A * 11/1976 Tanaka ......................... 248/68.1
4,463,482 A * 8/1984 Hawie .............................. 24/489
(Continued)

FOREIGN PATENT DOCUMENTS

CN         2846843        12/2006
DE    102012001195 A1 *  7/2013  ............. F24J 2/5254
(Continued)

OTHER PUBLICATIONS

Notification of Reasons for Refusal issued by the Japanese Patent Office on Oct. 27, 2015 in connection with Japanese Patent Application. No. 2012-117839.
(Continued)

*Primary Examiner* — Victor Batson
*Assistant Examiner* — Matthew Sullivan
(74) *Attorney, Agent, or Firm* — Jean C. Edwards, Esq.; Edwards Neils LLC

(57) ABSTRACT

A clip includes a pair of holding members arranged oppositely to one another to be capable of holding an elastic body therebetween, a base member, to which end portions of one side of the pair of holding members are coupled and at least one of the holding members is pivotably coupled, set on an object to be fixed, and pressing members provided on the holding members for pressing/retaining the elastic member between the pair of holding members.

11 Claims, 11 Drawing Sheets

(51) Int. Cl.
*F16B 5/06* (2006.01)
*F16B 21/08* (2006.01)

(58) Field of Classification Search
CPC ........ Y10T 24/44017; Y10T 24/44077; Y10T 24/4409; Y10T 424/44291; Y10T 24/44792; Y10T 24/44752; H03G 3/32
See application file for complete search history.

(56) References Cited

U.S. PATENT DOCUMENTS

| | | | |
|---|---|---|---|
| D291,177 S * | 8/1987 | Santucci et al. | D8/395 |
| 4,700,913 A * | 10/1987 | Hirano et al. | 248/73 |
| 4,887,324 A * | 12/1989 | Cairns | 4/609 |
| 5,906,342 A * | 5/1999 | Kraus | 248/74.1 |
| 7,201,352 B2 * | 4/2007 | Kawai | F16L 3/1075 24/543 |
| 7,887,012 B2 * | 2/2011 | Desai et al. | 248/55 |
| 8,157,222 B1 * | 4/2012 | Shirey et al. | 248/74.1 |
| 2003/0213876 A1* | 11/2003 | Takeuchi | 248/71 |
| 2007/0063111 A1* | 3/2007 | Alloway et al. | 248/71 |
| 2007/0276054 A1 | 11/2007 | Ui et al. | |
| 2010/0229355 A1* | 9/2010 | Wang | 24/489 |
| 2011/0315845 A1* | 12/2011 | Clawson | 248/316.5 |

FOREIGN PATENT DOCUMENTS

| | | |
|---|---|---|
| JP | 06-28313 U | 4/1994 |
| JP | 08-182600 A | 7/1996 |
| JP | 2001-330175 A | 11/2001 |
| JP | 2003-171490 A | 6/2003 |
| JP | 2007-314755 A | 12/2007 |
| JP | 2008-164085 A | 7/2008 |
| JP | 2010-123782 A | 6/2010 |

OTHER PUBLICATIONS

Notification of Second Office Action issued by the State Intellectual Property Office of China on Sep. 6, 2015 in connection with Chinese Patent Appl. No. 201280027895.7.
Notification of First Office Action issued by the State Intellectual Property Office of China on Feb. 2, 2015 in connection with Chinese Patent Appl. No. 201280027895.7.
International Search Report Issued in PCT/JP2012/064483 on Aug. 21, 2012.
Written Opinion Issued in PCT/JP2012/064483 on Aug. 21, 2012.

* cited by examiner

FIG.1
(a)
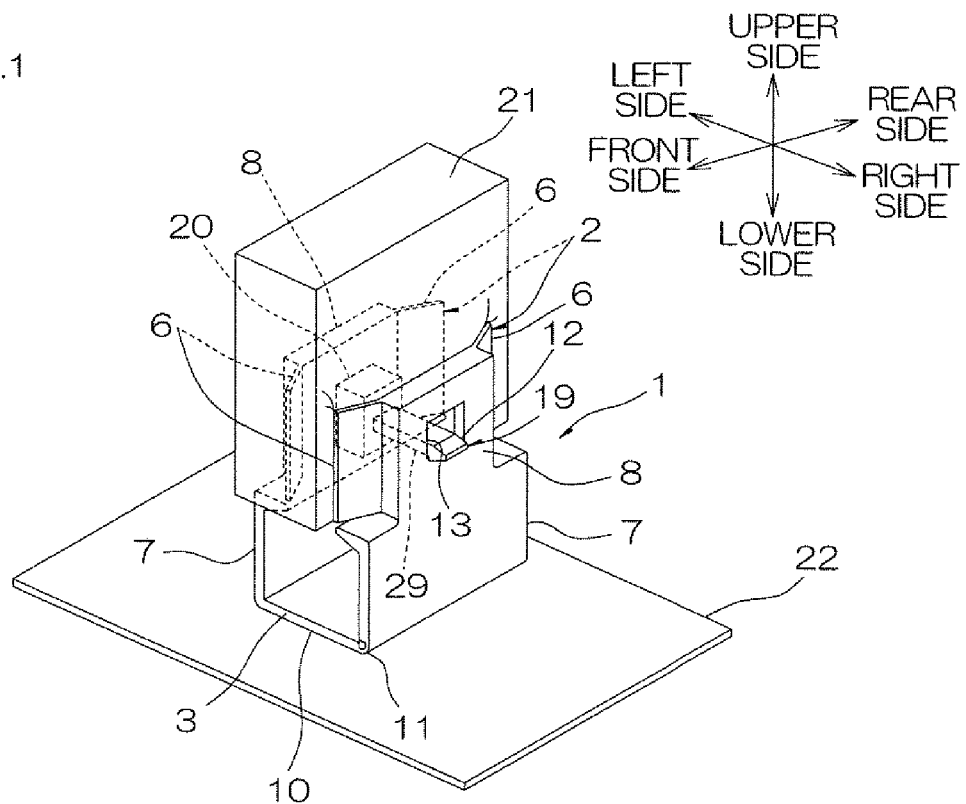
(b)
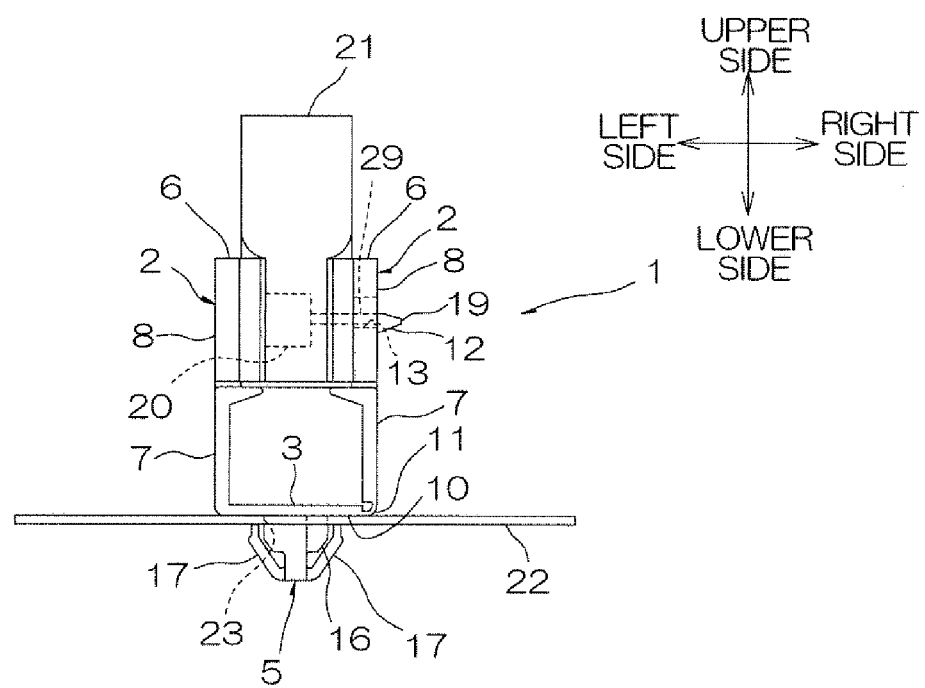

FIG.5
(a)
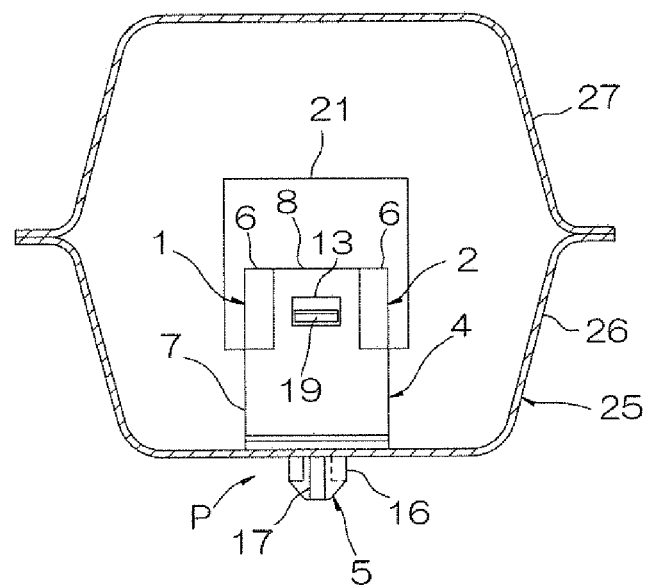
(b)
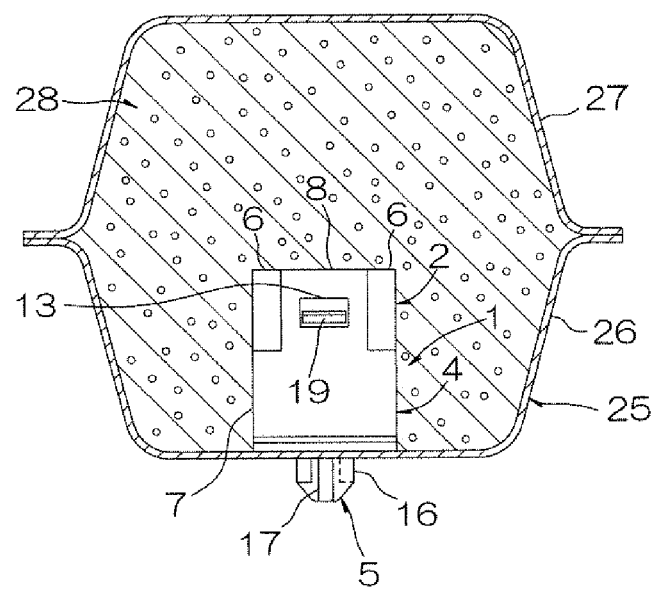

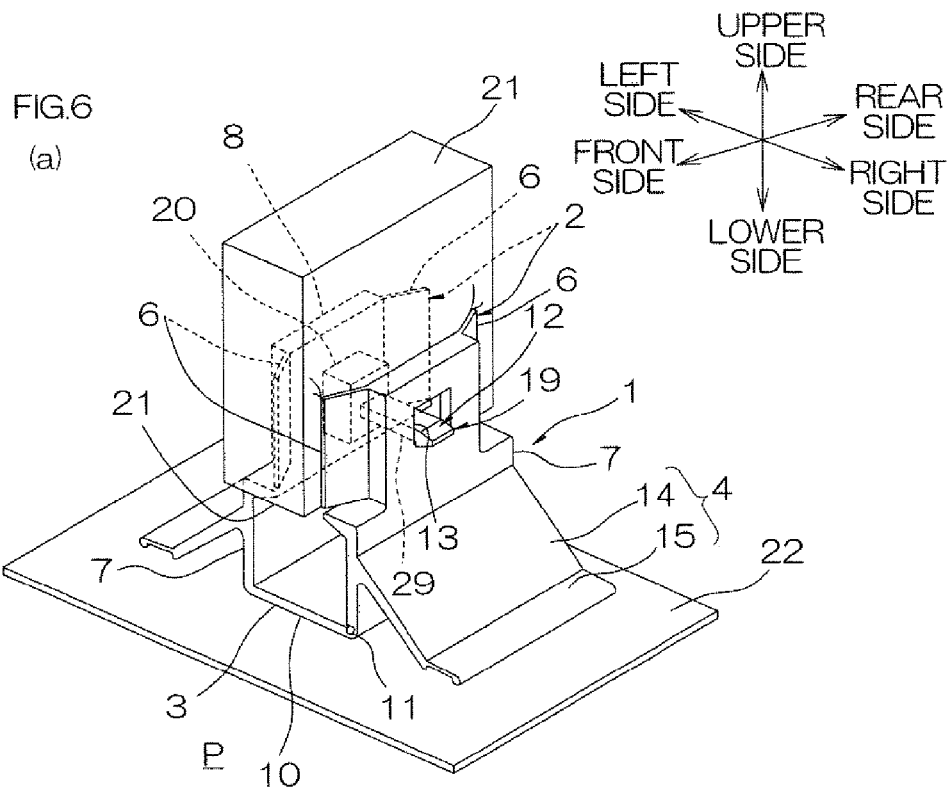
FIG.6 (a)
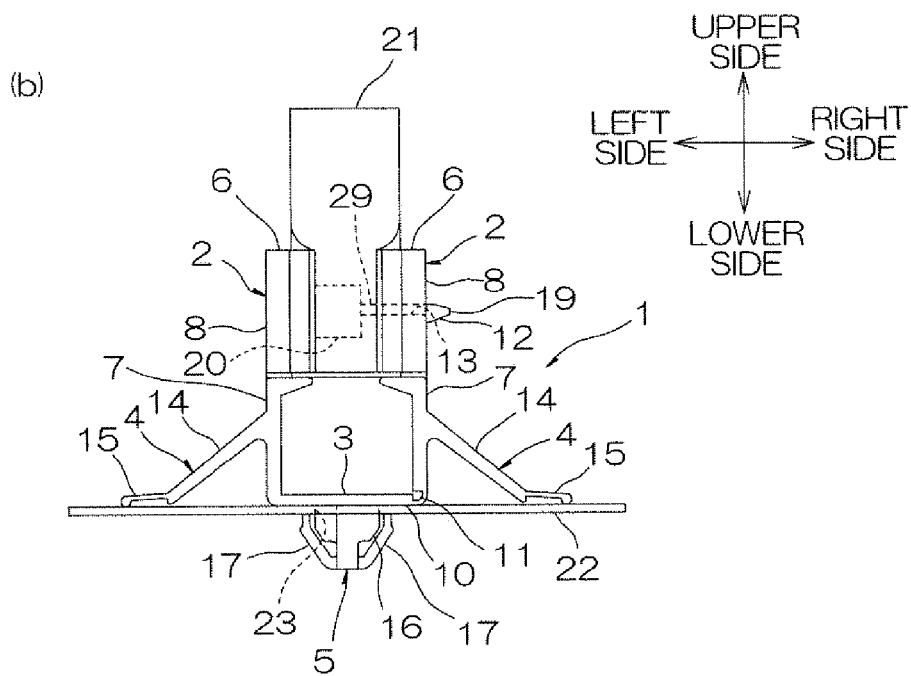
(b)

FIG.7
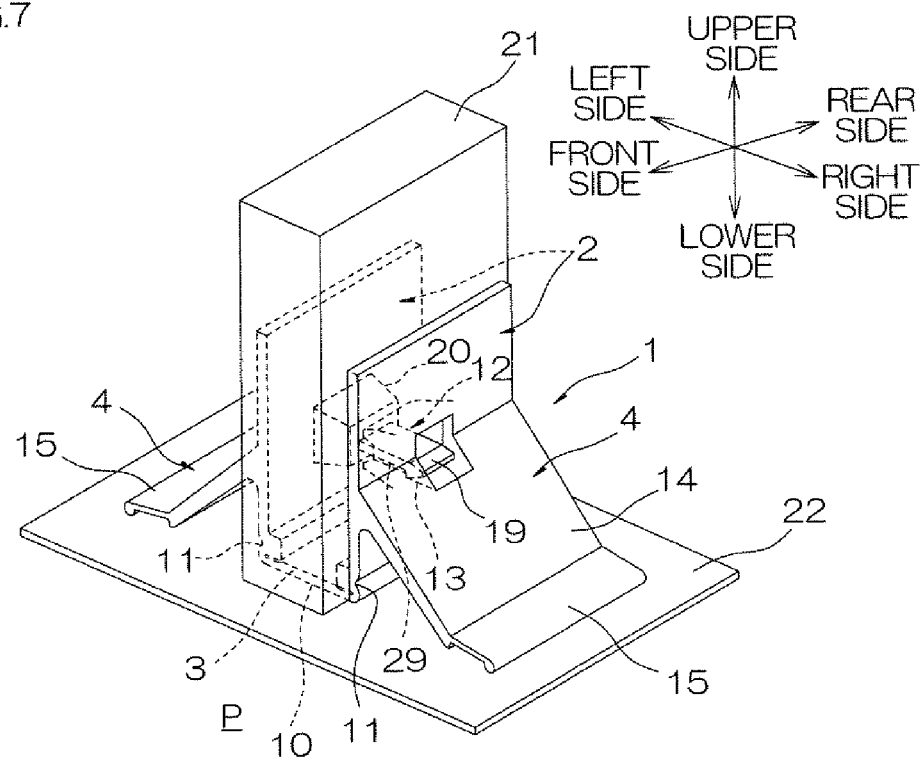
(a)
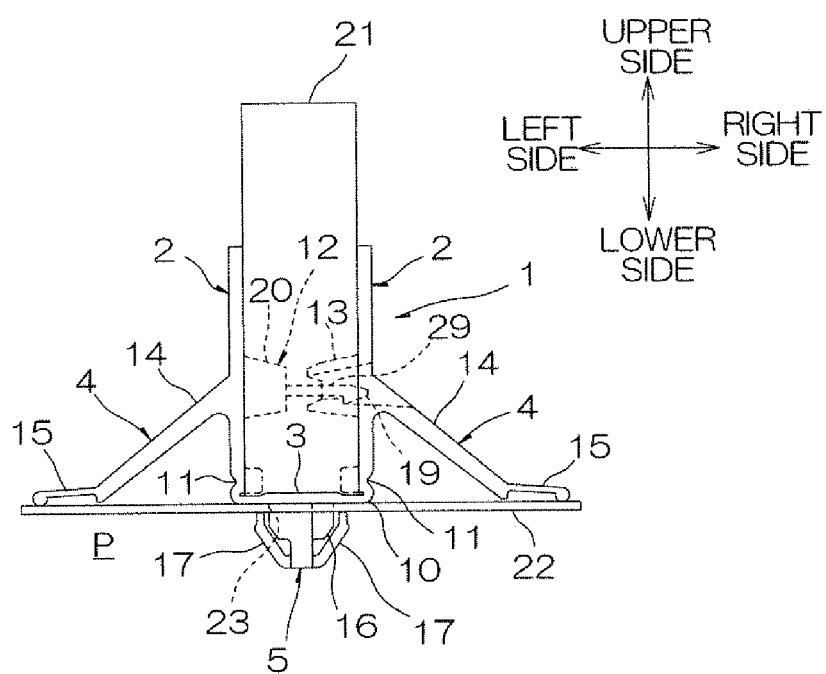
(b)

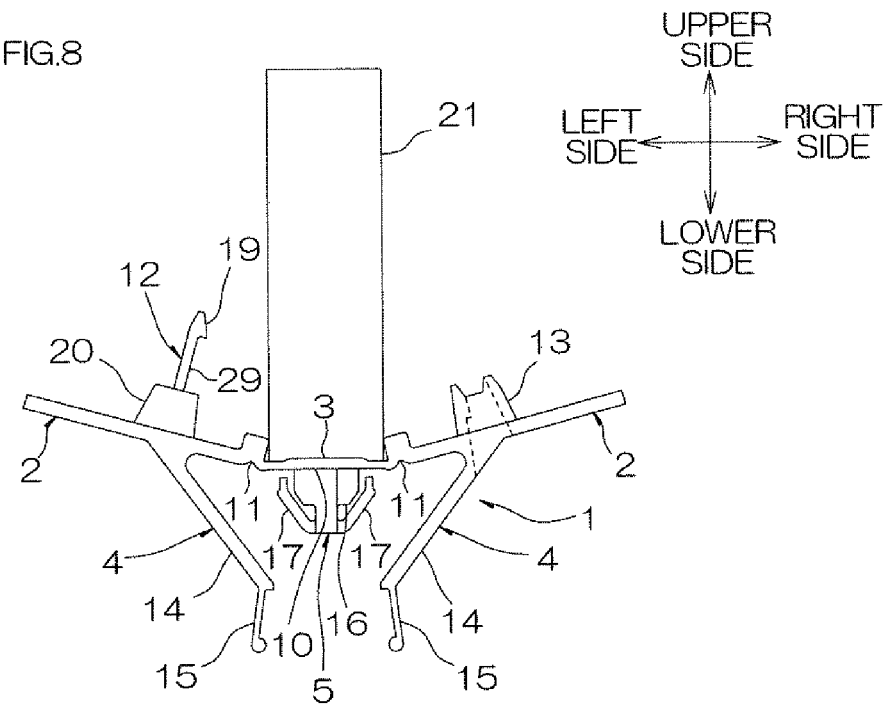
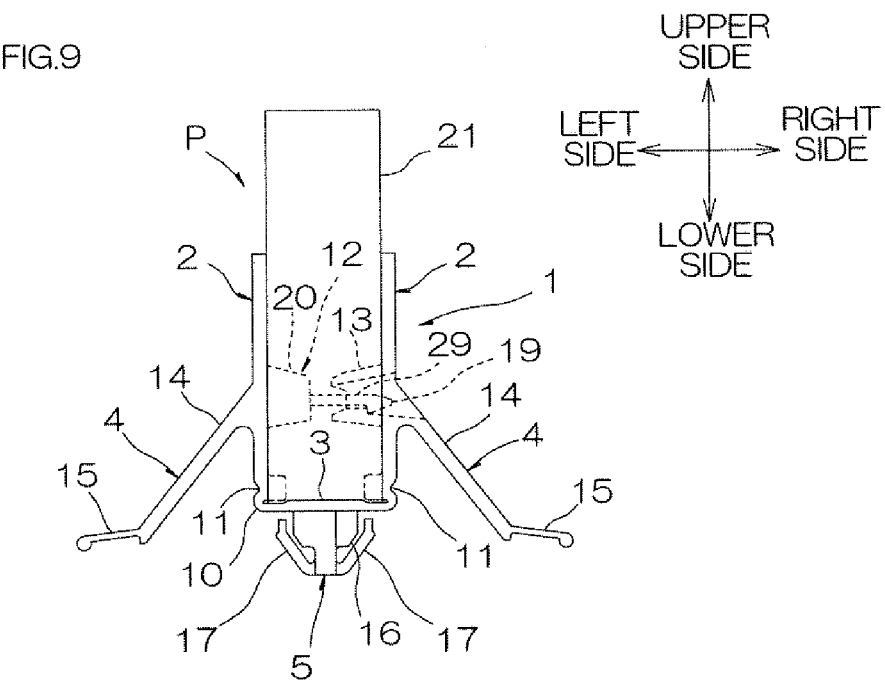

FIG.11
(a)
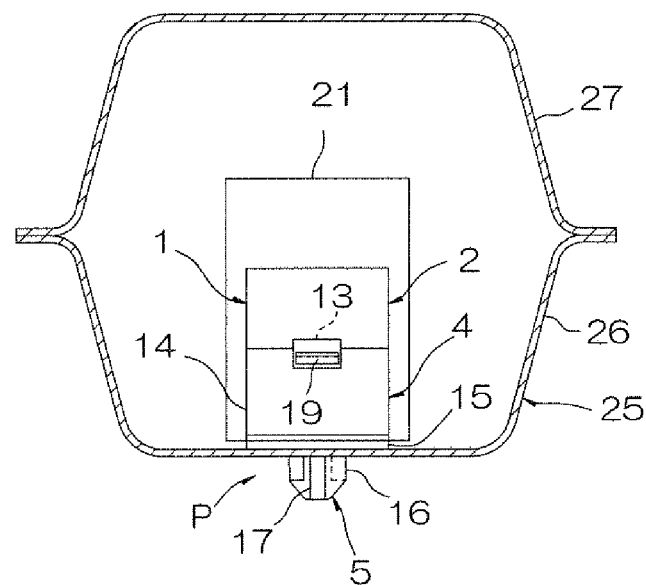
(b)
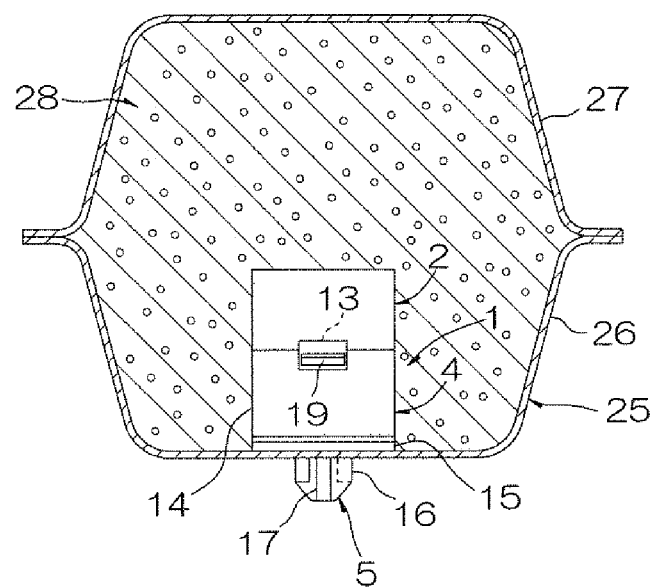

CLIP AND ELASTIC BODY ATTACHMENT COMPONENT

CROSS-REFERENCE TO RELATED APPLICATIONS

The present invention is a 35 U.S.C. 371 National Stage Entry of PCT/JP2012/064483, filed Jun. 5, 2012, which claims priority from Japanese Patent Application Nos. 2011-128377, filed on Jun. 8, 2011 and 2012-117839, filed on May 23, 2012, the contents of all of which are herein incorporated by reference in their entirety.

TECHNICAL FIELD

The present invention relates to a clip and an elastic body attachment component, and more particularly, it relates to a clip for attaching an elastic body to an object to be fixed, and an elastic body attachment component in which an elastic body is held by the clip.

BACKGROUND ART

In general, a sealant for sealing a clearance or cavities in members is employed for various industrial products such as an automobile, an electrical appliance, a house appliance and the like.

Such a sealant, for example, a foam body or the like obtained by vulcanizing/foaming a mixture containing ethylene-propylene-diene rubber, a vulcanizer and a foaming agent, is widely employed since the same is excellent for weather resistance, cold resistance, heat resistance, chemical resistance and the like and at a low cost.

Such a foam body is fixed to a clearance in a member to be sealed through a clip, for example (refer to Patent Document 1 described below).

It is known that a hollow member formed as a closed section such as a pillar of an automobile is filled up with a foam body, in order to prevent vibration or noise of the engine, wind noise or the like from being transmitted into the automobile cabin.

Such a foam body is formed by molding a composition for foaming/filling foaming by heating into a prescribed shape, fixing the obtained molding to the hollow member through a clip and thereafter foaming, crosslinking and curing the composition for foaming/filling by heating in a drying line step in a baking finish (refer to Patent Document 2 described below, for example).

PRIOR ART

Patent Document

Patent Document 1: Japanese Unexamined Patent Publication No. 2003-171490
Patent Document 2: Japanese Unexamined Patent Publication No. 2007-314755

SUMMARY OF THE INVENTION

Problems to be Solved by the Invention

In the foam body described in the aforementioned Patent Document 1 or the like, however, repulsive force lowers due to deterioration of the foam body over time or the like. Even if initially firmly fixed with the clip, therefore, retention of the foam body with the clip loosens when the repulsive force of the foam body lowers following the lapse of time, with a result that the foam body comes off the clip.

While the clip must reliably retain the composition for foaming/filling in order to fix the composition for foaming/filling to the hollow member with the clip, the clip according to the aforementioned Patent Document 2 merely retains the composition for foaming/filling to pass therethrough, and retention of the composition for foaming/filling with the clip is insufficient.

When trying to reliably retain the composition for foaming/filling, on the other hand, a retention member for continuously retaining the composition for foaming/filling is separately required, and the structure of the clip becomes complicated.

An object of the present invention is to provide a clip capable of continuously retaining an elastic body with a simple structure, and thereby provides elastic body attachment component in which an elastic body is held by the clip.

Means for Solving the Problems

In order to attain the aforementioned object, the clip according to the present invention includes a pair of holding members arranged oppositely to each other to be capable of holding an elastic body therebetween, a base member, to which end portions of one side of the pair of holding members are coupled and at least one of the holding members is pivotably coupled, set on an object to be fixed, and pressing members provided on the holding members for retaining the elastic body between the pair of holding members.

In the clip according to the present invention, the elastic body is held by the pressing members provided on the holding members. According to the inventive clip, therefore, the elastic body can be continuously retained with a simple structure.

In the clip according to the present invention, further, at least one of the holding members is pivotably coupled to the base member, whereby the elastic body can be continuously retained by the pressing member biased against the body.

Preferably in the clip according to the present invention, a fitting member is provided on one side of the holding members while a fitted member is provided on the other side of the holding members, and a holding state of the pair of holding members results due to fitting of the fitting member with the fitted member.

In such a clip, the holding state of the holding members can be more reliably retained due to the fitting of the fitting member and the fitted member provided on the holding members, and the elastic body can be continuously retained.

Preferably in the clip according to the present invention, the holding members are formed in plate shapes.

According to such a clip, the elastic body is retained by the holding members in plate shapes, whereby the structure of the clip can be more simplified.

Preferably in the clip according to the present invention, the pair of holding members and the base member are integrally molded from a resin material, and a coupling portion between at least the pivotably coupled one of the holding members and the base member is a thin hinge.

According to such a clip, the holding members and the base member are integrally molded, whereby reduction of the number of components and improvement of production efficiency can be attained.

According to such a clip, further, the coupling portion between the pivotably coupled holding member and the base member is the thin hinge, whereby no other member for rendering the holding member pivotable is required, but the structure of the clip can be more simplified.

Preferably, the clip according to the present invention includes a mooring member protruding from the base member toward the one side to be moored to the object to be fixed.

When the clip includes the mooring member, the base member can be firmly set on a fixed member by mooring the mooring member to the object to be fixed. Therefore, the elastic body can be firmly fixed to the fixed member.

Preferably in the clip according to the present invention, the mooring member includes an insertional portion protruding from the base member and inserted into the object to be fixed, and a hook portion provided on a free end portion of the insertional portion and protruding in a direction orthogonal to the insertional direction of the insertional portion.

In the mooring member, the insertional portion is inserted into the object to be fixed, while the hook portion provided on the free end portion thereof can be moored to the object to be fixed. Therefore, the mooring member can be reliably moored to the object to be fixed.

Preferably in the clip according to the present invention, the pressing members are provided as a pair on each of the holding members, the respective pressing members provided on the one side of the holding members are angled toward the other side of the holding members, the respective pressing members provided on the other side of the holding members are angled toward the one side of the holding members, and the pair of pressing members of the holding member on the one side and the pair of pressing members of the holding member on the other side retain the elastic body pressed between the pair of holding members.

In such a clip, the pressing members are provided as a pair on each of the holding members, and the elastic body is retained by the respective pressing members, whereby the elastic body can be more reliably retained by the pair of pressing members provided on each of the pair of holding members, i.e., by four pressing members.

Preferably in the clip according to the present invention, the pair of pressing members are arranged at an interval in a direction orthogonal to the opposed direction of the pair of holding members.

In such a clip, the pairs of pressing members are spaced apart in the direction orthogonal to the opposed direction of the pair of holding members, whereby the elastic body can be more stably retained.

Preferably in the clip according to the present invention, the holding members include pedestal portions and pressure contact portions, the pedestal portions are relatively thick plates and coupled to the base member, the pressure contact portions are relatively thick plates and extend toward a direction opposite to the base member with respect to the pedestal portions, and the pressing members are relatively thin plates and provided on the pressure contact portions.

According to such a clip, the pedestal portions and the pressure contact portions are relatively thick plates, whereby the clip can be strongly fixed to the object to be fixed with the pedestal portions and the pressure contact portions. Further, the pressing members are relatively thin plates, whereby stress (repulsive or biasing force) can be generated between the relatively thick pressure contact portions and the relatively thin pressing members in the holding state, and the elastic body can be reliably retained.

Preferably in the clip according to the present invention, the fitting member and the fitted member are provided on the pressure contact portions.

According to such a clip, the fitting member and the fitted member are provided on the thick pressure contact portions, whereby the respective pressure contact portions of the pair of holding members can be retained in an opposed state, and the elastic body can be reliably retained by the bias of the thin pressing members provided on the pressure contact portions.

Preferably in the clip according to the present invention, the pressing members are formed in flexible plate shapes.

In such a clip, the pressing members are formed in the flexible plate shapes, whereby the elastic body can be more reliably retained due to flexibility thereof.

Preferably, the clip according to the present invention includes an elastic member provided on at least one of the holding members and protruding toward the one side outwardly of the base member.

In such a clip, the elastic member protruding toward the one side outwardly of the base member comes into contact with the object to be fixed and receives reaction force or bias directed toward the other side when the base member is set on the object to be fixed. Then, the holding member, to which the elastic member is coupled, pivots with respect to the base member in a direction for holding the elastic body, due to the reaction force from the elastic member coming into contact with the object to be fixed. Thus, the elastic body is held by the pair of holding members. So far as the base member is set on the object to be fixed, the reaction force is continuously applied to the holding members from the elastic member, whereby the elastic body can be continuously retained in the clip with a simple structure.

Preferably in the clip according to the present invention, the respective elastic members are provided on both of the holding members.

When the respective elastic members are provided on both of the holding members, the elastic body can be firmly held due to holding force from both of the pair of holding members.

Preferably in the clip according to the present invention, the elastic member includes a relatively nonflexible base portion coupled to the holding members, and a relatively flexible free end portion coupled to the base portion.

In the elastic member, the flexible free end portion comes into contact with the object to be fixed and is deflected due to the reaction force, whereby elastic force or bias resulting from the deflection is transmitted to the holding members through the nonflexible base portion. Therefore, the reaction force received by the elastic member can be securely transmitted to the holding members, and holding of the elastic body with the holding members can be reliably attained.

The elastic body attachment component according to the present invention includes an elastic member and the aforementioned clip holding the elastic member.

The elastic body attachment component according to the present invention can continuously retain the elastic body with a simple structure, since the elastic body is held by the aforementioned clip.

Effects of the Invention

Accordingly, the clip according to the present invention can continuously retain an elastic body with a simple structure.

Furthermore, in the elastic body attachment component according to the present invention, an elastic body can be continuously retained with a simple structure.

BRIEF DESCRIPTION OF THE DRAWINGS

FIG. 1 shows a component fixed to a panel with a first embodiment of the clip according to the present invention (such as by pressing plates provided on holding plates), while (a) shows a perspective view, and (b) shows a front elevational view.

FIG. 5 is a step-by-step diagram of an embodiment of a method of filling up an internal space of a pillar of an automobile with a foam body for filling, while (a) shows a step of setting a clip mounted with a composition for foaming/filling in the internal space of the pillar, and (b) shows a step of filling up the internal space of the pillar with the foam body for filling by foaming, crosslinking and curing the composition for foaming/filling by heating.

FIG. 6 shows a component fixed to a panel with a second embodiment of the clip according to the present invention (pressing plates and elastic members being provided on holding plates), while (a) shows a perspective view, and (b) shows a front elevational view.

FIG. 7 shows a component fixed to a panel with a third embodiment of the clip according to the present invention (where holding plates are not provided with pressing plates but provided with elastic members), while (a) shows a perspective view, and (b) shows a front elevational view.

FIG. 8 shows a front elevational view of mounting the component on the clip shown in FIG. 7.

FIG. 9 shows a front elevational view where the component has been mounted on the clip shown in FIG. 7.

FIG. 11 is a step-by-step diagram of another embodiment of a method of filling up an internal space of a pillar of an automobile with a foam body for filling, while (a) shows a step of setting a clip mounted with a composition for foaming/filling in the internal space of the pillar, and (b) shows a step of filling up the internal space of the pillar with the foam body for filling by foaming, crosslinking and curing the composition for foaming/filling by heating.

EMBODIMENTS OF THE INVENTION

Figure 2:
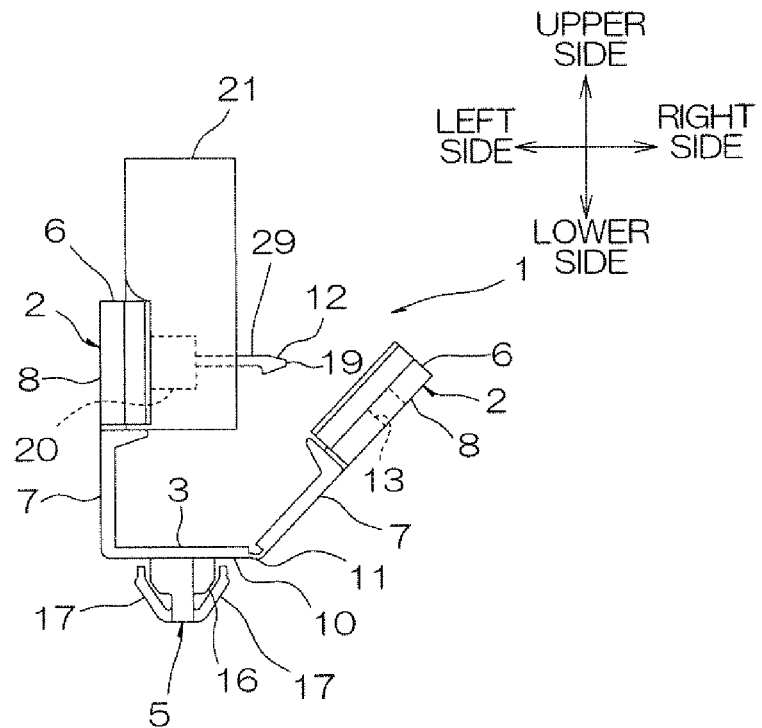
FIG. 2 shows a front elevational view of the component being mounted on the clip shown in FIG. 1.
Figure 3:
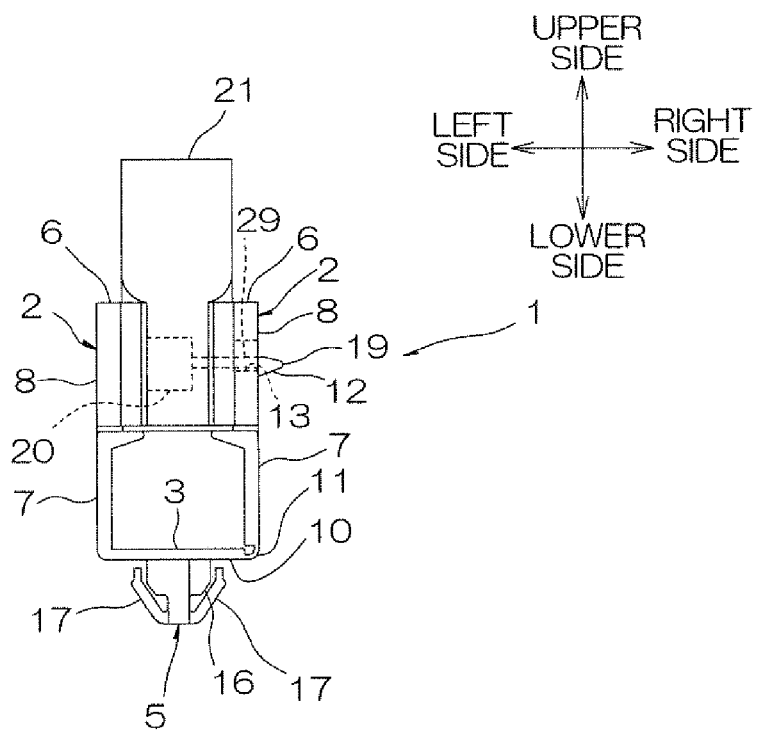
FIG. 3 shows a front elevational view in which the component has been mounted on the clip shown in FIG. 1.

FIG. 1 shows a component fixed to a panel with a first embodiment of the clip according to the present invention (pressing plates are provided on holding plates), while (a) shows a perspective view, and (b) shows a front elevational view. FIG. 2 shows a front elevational view of the component being mounted on the clip shown in FIG. 1. FIG. 3 shows a front elevational view in which the component has been mounted on the clip shown in FIG. 1.

In the following description, it is assumed that "one side" is the lower side and "another side" is the upper side with reference to FIG. 1(b) while a direction orthogonal to the up-down direction or the vertical direction is the left-right direction or the horizontal direction, and the paper thickness direction is the front-rear direction or the anteroposterior direction in the planes.

Referring to FIG. 1, a clip 1 according to one embodiment of the present invention is employed for fixing a component 21 to a panel 22 of a structure or the like in various industrial fields.

The clip 1 is formed as an injection-molded product of rigid plastic or the like, and integrally includes a pair of holding plates 2 as a pair of holding members, a base plate 3 as a base member coupling lower end portions (end portions of one side) of the pair of holding plates 2 with each other, pressing plates 6 as pressing portions provided on the holding plates 2, and a mooring member 5 as a mooring anchor protruding from the base plate 3 toward the lower side (the one side).

The pair of holding plates 2 are both formed in identical shapes, and more particularly, formed in shapes of vertically long generally rectangular plates having rigidity. The pair of holding plates 2 are arranged oppositely to each other in the horizontal direction, at a predetermined interval (i.e., an interval slightly narrower than the horizontal length of the component 21) capable of holding the component 21 as an elastic body therebetween.

The respective holding plates 2 include pedestal portions 7 and pressure contact portions 8 respectively.

The pedestal portions 7 are provided in the form of generally inverted L-shaped plates (i.e., in the form of hooks) in side elevational view, extending along the vertical direction and bent toward inner portions in the opposed direction of the pair of holding plates 2 on upper end portions thereof. Such pedestal portions 7 are relatively thicker than the pressing plates 6 described later, and lower end portions thereof are coupled to the base plate 3 described later.

The pressure contact portions 8 are formed in generally rectangular plate shapes long in the vertical direction and narrower than the pedestal portions 7 in the anteroposterior direction. Such pressure contact portions 8 are relatively thicker than the pressing plates 6 described later, and formed to extend toward the upper direction from the upper end portions of the aforementioned pedestal portions 7.

The base plate 3 is set on the panel 22 as an object to be fixed, with a lower surface thereof serving as a set surface 10. The base plate 3 is formed in a generally rectangular plate shape, long in the anteroposterior direction, having rigidity. The anteroposterior length of the base plate 3 is set to the same length as the anteroposterior length of the pair of holding plates 2.

Such a base plate 3 is integrally molded by the same resin material as the aforementioned pair of holding plates 2.

The base plate 3 is coupled to the lower end portion of the right (one side) holding plate 2 through a thin hinge 11 on a right-side end portion thereof, and the right holding plate 2 is coupled to the base plate 3 to be pivotable in the plane on the right-side end portion of the base plate 3. In other words, a coupling portion between the pivotably coupled right (one side) holding plate 2 and the base plate 3 is the thin hinge 11.

The base plate 3 is coupled to the lower end portion of the left (the other side) holding plate 2 on a left-side end portion thereof without using the thin hinge 11 or the like, and the left holding plate 2 is rigidly coupled to the base plate 3.

Thus, the right (one side) holding plate 2 is coupled to the base plate 3 to be single-hingeable by pivoting the same in a holding direction (inwardly towards the other holding plate 2); it can also be pivoted outwardly, away from the other holding plate 2.

The pressing plates 6 are formed in generally rectangular flexible plate shapes having a length generally identical to the vertical length of the pressure contact portions 8, and provided on both anteroposterior end portions of the pressure contact portions 8. Such pressing plates 6 are formed relatively thinner than the aforementioned pressure contact portions 8 and the pedestal portions 7, and two pressing plates 6 are provided on each of the holding plates 2 as a pair, in order to press/retain the component 21 between the pair of holding plates 2.

More specifically, the two (the pair of) pressing plates 6 provided on the left (one side) holding plate 2 are angled toward the right (the other side) holding plate 2, while the two (the pair of) pressing plates 6 provided on the right (the other side) holding plate 2 are angled toward the left (one side) holding plate 2. Thus, the pair of pressing plates 6 on the left side (the one side) and the pair of pressing plates 6 on the right side (the other side) retain the component 21 between the pair of holding plates 2.

More particularly, each pair of pressing plates 6 are angled from both side edges of the pressure contact portion 8 in the direction (more specifically, the anteroposterior direction) orthogonal to the opposed direction of the pair of holding plates 2, to form an obtuse angle (more specifically, 100 to 170° in top plan view, preferably 140 to 160°) with the pressure contact portion 8. Thus, the pair of pressing plates 6 are spaced in the direction (more specifically, the anteroposterior direction) orthogonal to the opposed direction of the pair of holding plates 2.

In the pair of holding plates 2, a fitting pawl 12 as a fitting member is provided on the pressure contact portion 7 of the left holding plate 2, while a fitting receiving portion 13 as a fitted member is provided on the pressure contact portion 8 of the right holding plate 2.

The fitting pawl 12 includes a pedestal 20 protruding from a vertical intermediate portion of the left holding plate 2 toward the right holding plate 2, a protruding member 29 protruding from the pedestal 20 toward the right holding plate 2, and a hooked pawl 19 provided on a free end portion of the protruding member 29.

The fitting receiving portion 13 is formed by a fitting hole with which the pawl 19 of the fitting pawl 12 is fittable, and is formed on a vertical intermediate portion of the right holding plate 2, in a generally rectangular shape in side elevational view passing through the pressure contact portion 8 in the thickness direction.

As described later in detail, the holding state of the pair of holding plates 2 is rendered retainable, due to fitting of the fitting pawl 12 and the fitting receiving portion 13.

The mooring member 5 has rigidity, is provided to be moored to the panel 22, and includes an insertional portion 16 inserted into a mooring hole 23 of the panel 22 and hook portions 17 provided on free end portions of the insertional portion 16.

The insertional portion 16 is formed in a protruding plate shape or a shaft shape, and protrudes from the horizontal and anteroposterior center in the set surface 10 of the base plate 3 downwardly a distance greater than the thickness of panel 22.

Two hook portions 17 protrude from the free end portions of the insertional portion 16 in the horizontal direction (or the anteroposterior direction, although not shown) orthogonal to an insertional direction of the insertional portion 16; and, more specifically, the two hook portions 17 sandwich the free end portions of the insertional portion 16 from left and right (or front and behind, although not shown). Each hook portion 17 protrudes from the free end portion of the insertional portion 16 and can be bent upward, and each has flexibility in directions both towards and away from the insertional portion 16. Each hook portion 17 can be bent away from the insertional portion 16, due to elastic force thereof.

A method of fixing the component 21 to the panel 22 with the clip 1 is now described with reference to FIGS. 1 to 3.

The component 21, varying with the object and the application thereof and not particularly restricted, is made of an elastically deformable rubber material or a foam material, for example, and more specifically, the same is formed into a generally rectangular flat plate shape from a foam material (already foaming rubber) described later. A through hole (not shown) passable by the fitting pawl 12 and the pedestal 20 is formed in the component 21.

The panel 22 is part of a structure utilizable in various industrial fields, and perforated with the mooring hole 23 circular in plan view, to which the clip 1 is moored.

In order to fix the component 21 to the panel 22, the component 21 is first inserted between the holding plates 2 so that the longitudinal direction of the component 21 is along the vertical direction while rendering the right (one side) holding plate 2 single-hinged with respect to the base plate 3, as shown in FIG. 2. Then, the fitting pawl 12 and the pedestal 20 are made to pass through the through-hole (not shown) of the component 21, to retain the component 21 between the holding plates 2.

Then, the pair of holding plates 2 are moved in the holding direction with respect to the base plate 3 so that the same approach each other, to hold the component 21 with the pair of holding plates 2, as shown in FIG. 3. At this time, the pawl 19 of the fitting pawl 12 fits with the fitting receiving portion 13, and the holding state of the pair of holding plates 2 is retained. At this time, further, the component 21 is pressed by the four pressing plates 6 inward in the opposed direction of the holding plates 2, and held between the holding plates 2 due to the elastic pressure of the pressing plates 6.

Thus, the component 21 is mounted on the clip 1, and an elastic body attachment component P including the component 21 and the clip 1 holding the component 21 has now been prepared.

Then, the mooring member 5 is moored to the panel 22, as shown in FIG. 1. More specifically, the mooring member 5 is pushed into the mooring hole 23. As the mooring member 5 is being pushed into the mooring hole 23, the hook portions 17 are pressed towards the insertional portion 16 for inserting the insertional portion 16 of the clip 1 into the mooring hole 23 of the panel 22, until the set surface 10 of the base plate 3 is set on the upper surface of the panel 2. Thereafter, the pushing force against the mooring portion 5 is released. Then, the hook portions 17 move away from the insertional portion 16 due to elastic force thereof, and free end portions of the hook portions 17 come into contact with the lower surface of the panel 22, whereby the mooring member 5 is moored to the panel 22.

Thus, the clip 1 is fixed to the panel 22 by holding the panel 22 between the set surface 10 of the base plate 3 and the free end portions of the hook portions 17 while holding the component 21 with the pair of holding plates 2, and the component 21 is thus also fixed to the panel 22 with the clip 1.

In the clip 1, the component 21 is held by the pressing plates 6 provided on the holding plates 2. Thus the component 21 can be continuously retained with a simple structure.

In the clip 1, further, the right holding plate 2 is pivotably coupled to the base plate 3, whereby the holding plate 2 can be made to follow pressing force of the right pressing plate 6, and the component 21 can be continuously retained.

According to such a clip 1, the component 21 is retained with the plate-shaped holding plates 2, whereby the structure of the clip 1 can be more simplified.

According to such a clip 1, further, the holding plates 2 and the base plate 3 are integrally molded, whereby reduction of the number of components and improvement of production efficiency can be attained.

According to such a clip 1, in addition, the coupling portion between the pivotably coupled holding plate 2 and the base plate 3 is the thin hinge 11, whereby no other member for rendering the holding plate 2 pivotable is required, but the structure of the clip 1 can be simplified even further.

In such a clip 1, the pressing plates 6 are provided in a pair on each holding plate 2 and the component 21 is retained by the respective pressing plates 6, whereby the component 21 can be more reliably retained with the pair of pressing plates 6 provided on each of the pair of holding plates 2, i.e., the four pressing plates 6.

In such a clip 1, further, the pair of pressing plates 6 are spaced in the direction orthogonal to the opposed direction of the holding plates 2, whereby the component 21 can be more stably retained.

According to such a clip 1, the pedestal portions 7 and the pressure contact portions 8 are relatively thick plates, whereby the clip 1 can be strongly fixed to the panel 22. Further, the pressing plates 6 are relatively thin plates, whereby stress (repulsive force) can be generated between the relatively thick pressure contact portions 8 and the relatively thin pressing plates 6 in the holding state, and the component 21 can be reliably retained.

In such a clip 1, the pressing plates 6 are formed in flexible plate shapes, whereby the component 21 can be more reliably retained due to flexibility thereof.

In such a clip 1, further, the holding state of the holding plates 2 can be more reliably retained due to the fitting of the fitting pawl 12 and the fitting receiving portion 13 provided on the holding plates 2, and the component 21 can be continuously retained.

According to such a clip 1, the fitting pawl 12 and the fitting receiving portion 13 are provided on the thick pressure contact portions 8, whereby the respective pressure contact portions 8 of the pair of holding plates 2 can be retained in an opposed state, and the component 21 can be reliably retained by the thin pressing plates 6 provided on the pressure contact portions 8.

In the clip 1, in addition, the base plate 3 can be firmly set on the panel 22 by mooring the mooring member 5 to the panel 22. Therefore, the component 21 can be firmly fixed to the panel 22.

In the mooring member 5, further, the insertional portion 16 is inserted into the mooring hole 23 of the panel 22, while the hook portions 17 provided on the free end portions thereof can be moored to the lower surface of the panel 22. Therefore, the mooring member 5 can be reliably moored to the panel 22.

In such an elastic body attachment component P, therefore, the clip 1 can be fixed to the panel 22 while continuously holding the component 21, whereby, even if the component 21 is a foam material that deteriorates over time such that the repulsive force between the holding plates 2 lowers, the pressing plates 6 of both holding plates 2 so hold the foam material following the lowering of the repulsive force that the foam material can still be stably retained.

In such an elastic body attachment component P, therefore, the clip 1 is preferably employed for fixing a foam body (hereinafter referred to a foam body for filling) for filling up a clearance in members or an internal space of a hollow member to the clearance in the members or the internal space of the hollow member, such as by use of the component 21.

The component 21 may be a relatively rigid foam material, or may be a relatively soft foam material.

The clip 1 may be made to retain a foam body for filling foamed in advance and fixed to the panel 22 (see FIG. 4 described later), or may be made to retain a foam body for filling before foaming and fixed to the panel 22, so that the foam material is thereafter foamed (see FIG. 5 described later).

Figure 4:
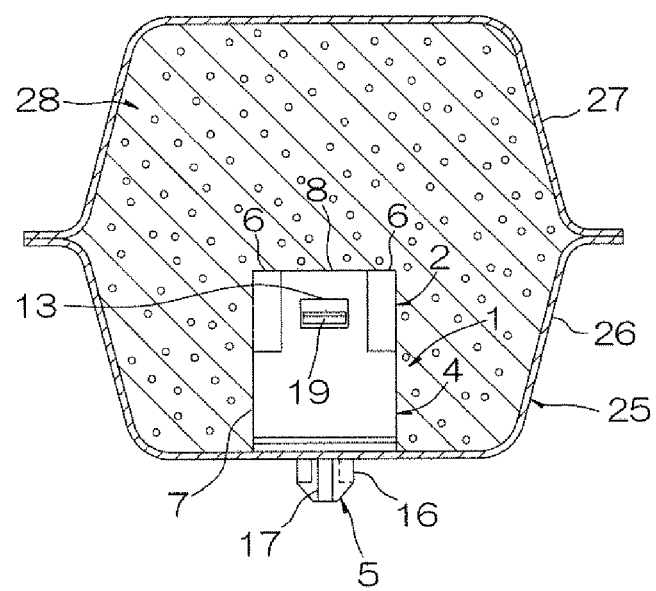
FIG. 4 is a sectional view showing an embodiment in which a foam body for filling is fixed to an internal space of a pillar through the clip shown in FIG. 1.

FIG. 4 is a sectional view showing such an embodiment that a foam body for filling is fixed to an internal space of a pillar through the clip shown in FIG. 1.

Referring to FIG. 4, for example, in the elastic body attachment component P, the clip 1 is employed for filling up an internal space of a hollow member formed as a closed section such as a pillar 25 of an automobile with a foam body 28 for filling for preventing vibration or noise of the engine, wind noise or the like from being transmitted into the automobile cabin.

The foam body 28 for filing is a foam body (a foam material) formed by vulcanizing/foaming a mixture containing ethylene-propylene-diene rubber, a vulcanizer and a foaming agent, for example.

In order to fill up the internal space of the pillar 25 with the foam body 28 for filling, the clip 1 together with the foam body 28 for filling as the component 21 is set in the pillar 25, as described above. More specifically, the clip 1 mounted with the foam body 28 for filling is fixed to an inner panel 26 as the panel 22 as shown in FIG. 1.

The pillar 25 includes the inner panel 26 and an outer panel 27 generally concave in section, and is formed as a closed section by setting the foam body 28 for filling on the inner panel 26 and thereafter bonding both end portions of the inner panel 26 and the outer panel 27 by welding. More specifically, such a pillar 25 can be a front pillar, a side pillar or a rear pillar of the automobile.

In the elastic body attachment component P, the clip 1 can be employed also for fixing the component 21 in which a composition for foaming/filling before foaming is formed in a sheet shape to the internal space of the pillar 25, thereafter forming the foam body 28 for filling by foaming the component 21, and filling up the internal space of the pillar 25 with the foam body 28 for filling.

FIGS. 5(*a*) and 5(*b*) are step-be-step diagrams of one embodiment of a method of filling up an internal space of a pillar of an automobile with a foam body for filling, while (a) shows a step of setting a clip mounted with a composition for foaming/filling in the internal space of the pillar, and (b) shows a step of filling up the internal space of the pillar with the foam body for filling by foaming, crosslinking and curing the composition for foaming/filling by heating.

The embodiment of the method of filling up the internal space of the pillar of the automobile with the foam body for filling is described with reference to FIG. 5.

In the method, a clip 1 mounted with a component 21 in which a composition for foaming/filling before foaming is formed in a sheet shape, i.e., an elastic body attachment component P, is first prepared as shown in FIG. 5(a), similar to the arrangement shown in FIG. 3.

The component 21 is formed from a composition for foaming/filling foamable, crosslinkable and curable by heating, and such a composition for foaming/filling can be prepared by molding a well-known composition for foaming/filling (the composition for foaming/filling described in Japanese Unexamined Patent Publication No. 2007-314755 or the like, for example) containing a polymer and a foaming agent or the like into a sheet shape.

In the composition for foaming/filling, the volume expansion ratio (density before foaming/density after foaming) at the time of foaming is not less than twice, for example, and preferably not less than 10.

According to the method of this embodiment of the present invention, the clip 1 mounted with the component 21 is set in a pillar 25, as shown in FIG. 5(a). More specifically, the clip 1 mounted with the component 21 made of the composition for foaming/filling is fixed to an inner panel 26, similar to the arrangement shown in FIGS. 1-3.

The pillar 25 includes the inner panel 26 and an outer panel 27 generally concaved in section, and is formed as a closed section by setting the component 21 on the inner panel 26 and thereafter bonding both end portions of the inner panel 26 and the outer panel 27 by welding. More specifically, such a pillar 25 may be a front pillar, a side pillar or a rear pillar of the automobile.

Thereafter in the method, the pillar 25 is heated at a temperature of not less than 140° C. and not more than 180° C., for example, and preferably not less than 160° C. and not more than 180° C., by utilizing heat in a drying line step at a time of a subsequent baking finish. Thus, a foam body 28 (a foam material) for filling can be formed as shown in FIG. 5(b), and the internal space of the pillar 25 can be substantially closely filled up with the foam body 28 for filling.

The shape, a set position, an arrangement direction, an arrangement number etc. of the component 21 are properly selected in response to the shape of the pillar 25 or the like.

While the component 21 has been arranged between the pressure contact portions 8 and pressed/retained and no component 21 has been arranged between the pedestal portions 7 in the above description, the component 21 may be arranged over the space between the pressure contact portions 8 and the pedestal portions 7, for example, and pressed/retained therebetween, although this embodiment is not shown.

In such a case, the component 21 is pressed by the pedestal portions 7 in the form of generally inverted L-shaped plates (i.e., in the form of hooks) in side elevational view, and can be more reliably retained.

While the one (right) holding plate 2 has been pivotably coupled to the base plate 3 through the thin hinge 11 to be single-hinged opening on the right side in the above description, the other (left) holding plate 2 can be pivotably coupled to the base plate 3 through the thin hinge 11 to be single-hinged opening on the left side, for example, an embodiment also not shown. Further, the pair of holding plates 2 can be coupled to the base plate 3 to be double-hingeable by pivotably coupling both (right and left) holding plates 2 of the holding plates 2 to the base plate 3 through thin hinges 11, for example, although not shown.

Also according to the clip 1, effects similar to the above can be attained.

FIG. 6 shows such a mode that a component is fixed to a panel according to a second embodiment (such a form that pressing plates and elastic members are provided on holding plates) of the clip according to the present invention, while (a) shows a perspective view, and (b) shows a front elevational view.

In the following description, it is assumed that "one side" is the lower side and "another side" is the upper side with reference to FIG. 6(b), while a direction orthogonal to the vertical direction is the horizontal direction, and the paper thickness direction is the anteroposterior direction in the planes.

Referring to FIG. 6, members corresponding to the aforementioned respective portions are denoted by the same reference signs as were used in the previous embodiments, and detailed description thereof is omitted.

A clip 1 can further include an elastic member 4 as an elastic member provided on each of a pair of holding plates 2.

The elastic member 4 is formed in generally rectangular plate shape identical in width to the holding plate 2 in the anteroposterior direction, and provided on each of the holding plates 2. More specifically, the respective elastic members 4 are coupled to pedestal portions 7 in vertical intermediate portions of outer side surfaces of the pair of holding plates 2 in an opposed direction, and provided to protrude downward from the respective outer side surfaces to be spaced from the respective outer side surfaces and to be directed outward, i.e., to angle downwardly from the respective outer side surfaces of the holding plate toward lower outer sides.

The elastic members 4, preferably identical in width to the holding plates 2, can also be formed with a different width from the holding plates 2, in response to the object and the application thereof. In this case, the ratio between the widths of the elastic members 4 and the holding plates 2 is preferably in the range of from 1:2 to 2:1.

While the respective elastic members 4 angle downwardly and protrude from the outer side surfaces of the respective holding plates 2 toward the lower outer sides in FIG. 6, the same can also be provided to be generally L-shaped in front sectional view, to temporarily extend outward from the outer side surfaces of the respective holding plates 2 and to thereafter extend downward, for example.

Free end portions of the respective elastic members 4 protrude downward (toward one side) away from a set surface 10 of a base plate 3, in a state where the pair of holding plates 2 hold a component 21 therebetween.

The elastic members 4 include base portions 14 coupled to the outer side surfaces of the holding plates 2 and free end portions 15 coupled to the base portions 14.

The base portions 14 are relatively nonflexible, i.e., hard, and formed as about ¾ the lengths of the elastic members 4 closer to the sides of base ends.

The free end portions 15 are formed to be thinner than the base portions 14, relatively flexible, i.e., soft, and formed as about ¼ the lengths of the elastic members 4, and closer to the sides of free ends. The free end portions 15 spread outward beyond the base portions 14, whereby the free end portions 15 can be deflected in the vertical direction by bending outward with respect to the base portions 14.

A component 21 is mounted on such a clip 1 similarly to the procedures set forth above with respect to the embodiments shown in FIGS. 1-3, and an elastic body attachment component P including the component 21 and the clip 1 holding the component 21 is thus prepared.

As shown in FIG. 6(b), a mooring member 5 is moored to a panel 22. In other words, the clip 1 is fixed to the panel 22 by holding the panel 22 between the set surface 10 of the base plate 3 and free end portions of hook portions 17, while holding the component 21 with the pair of holding plates 2, and the component 21 is fixed to the panel 22 with the clip 1.

When setting the base plate 3 on the panel 22, the free end portions 15 of the elastic members 4 protruding downward beyond the base plate 3 come into contact with the panel 22 and receive upward reaction force. Then, the flexible free end portions 15 are deflected due to the reaction force, whereby elastic force resulting from the deflection is transmitted to the holding plates 2 through the nonflexible base portions 14. As a result of the reaction forces, both holding plates 2 pivot with respect to the base plate 3 in a direction for holding the component 21 therebetween. Thus, the component 21 is held by the pair of holding plates 2. So far as the base plate 3 is set on the panel 22, the reaction force is continuously applied to both holding plates 2 from the elastic members 4, whereby such a clip 1 can continuously retain the component 21 with a simple structure. In other words, the elastic body attachment component P can continuously retain the component 21 with a simple structure.

Particularly in the clip 1, the respective elastic members 4 are provided on both holding plates 2, whereby the component 21 can be firmly retained due to holding force from both of the pair of holding plates 2.

In the elastic members 4, further, the flexible free end portions 15 come into contact with the panel 22 and are deflected due to the reaction force, whereby the elastic force resulting from the deflection is transmitted to the holding plates 2 through the nonflexible base portions 14. Therefore, the reaction force received by the elastic members 4 can be securely transmitted to the holding plates 2, and holding of the component 21 with the holding plates 2 can be reliably attained.

In a manner similar to that shown in FIGS. 4 and 5, the clip 1 is employed for filling up an internal space of a hollow member formed as a closed section such as a pillar 25 of an automobile with a foam body 28 for filling for preventing vibration or noise of the engine, wind noise or the like from being transmitted into the automobile cabin in such an elastic body attachment component P.

FIG. 7 shows such a mode that a component is fixed to a panel with a third embodiment (such a form that holding plates are not provided with pressing plates but provided with elastic members) of the clip according to the present invention, while (a) shows a perspective view, and (b) shows a front elevational view. FIG. 8 shows a front elevational view of the component about to be mounted on the clip shown in FIG. 7. FIG. 9 shows a front elevational view in which the component has been mounted on the clip shown in FIG. 7.

In the following description, it is assumed that "one side" is the lower side and "another side" is the upper side with reference to FIG. 7(b), while a direction orthogonal to the vertical direction is the horizontal direction, and the paper thickness direction is the anteroposterior direction in the planes.

While the pressing plates 6 have been provided on the holding plates 2 as pressing members in the above description, holding plates 2 may include the aforementioned elastic members 4 as pressing members, for example, without including pressing plates 6.

Referring to FIG. 7, a clip 1 according to still another embodiment of the present invention is employed for fixing a component 21 to a panel 22 of a structure or the like in various industrial fields.

The clip 1 is formed as an injection-molded product of rigid plastic or the like, and integrally includes a pair of holding plates 2 as a pair of holding members, a base plate 3 as a base member coupling lower end portions (end portions of one side) of the pair of holding plates 2 with each other, elastic members 4 as elastic members and pressing members provided on the pair of holding plates 2 respectively, and a mooring member 5 as a mooring member protruding from the base plate 3 toward the lower side (the one side).

The pair of holding plates 2 are both formed in identical shapes, and more particularly, formed in shapes of vertically long generally rectangular plates having rigidity. The pair of holding plates 2 are spaced oppositely to each other in the horizontal direction, at an interval slightly narrower than the horizontal thickness of the component 21 capable of holding the component 21 as an elastic body therebetween.

The base plate 3 is set on the panel 22 as an object to be fixed, with a lower surface thereof serving as a set surface 10. The base plate 3 is formed in a generally rectangular plate shape, long in the anteroposterior direction, having rigidity. The anteroposterior length of the base plate 3 is set to the same length as the anteroposterior length of the pair of holding plates 2.

The base plate 3 is coupled to the lower end portion of the right (one side) holding plate 2 through a thin hinge 11 on a right-side end portion thereof, and the right holding plate 2 is coupled to the base plate 3 to be pivotable in the plane on the right-side end portion of the base plate 3.

The base plate 3 is coupled to the lower end portion of the left (the other side) holding plate 2 through a thin hinge 11 on a left-side end portion thereof, and the left holding plate 2 is pivotably coupled to the base plate 3 to be pivotable in the plane on the left-side end portion of the base plate 3.

Thus, the pair of holding plates 2 are coupled to the base plate 3 to be double-hingeable by pivoting the same in a holding direction (inward towards one another in an opposed direction of the pair of holding plates 2) and the direction away from one another (outward in the opposed direction of the pair of holding plates 2) opposite thereto through the thin hinges 11.

In the pair of holding plates 2, a fitting pawl 12 as a fitting member is provided on the left holding plate 2, while a fitting receiving portion 13 as a fitted member is provided on the right holding plate 2.

The fitting pawl 12 includes a pedestal 20 protruding from a vertical intermediate portion of the left holding plate 2 toward the right holding plate 2, a protruding member 29 protruding from the pedestal 20 toward the right holding plate 2, and a hooked pawl 19 provided on a free end portion of the protruding member 29.

The fitting receiving portion 13 is formed by a fitting hole with which the pawl 19 of the fitting pawl 12 is fittable, and formed on a vertical intermediate portion of the right holding plate 2, in a generally rectangular shape in side elevational view passing through the holding plate 2 in the thickness direction.

The elastic members 4 are formed in rectangular plate shapes identical in width to the holding plates 2 in the anteroposterior direction, and provided on both holding plates 2 respectively. More specifically, the respective elastic members 4 are coupled to vertical intermediate portions of outer side surfaces of the pair of holding plates 2 in the opposed direction, and provided to protrude downward from the respective outer side surfaces away from the respective outer side surfaces and to be directed outward, i.e., to protrude downwardly from the respective outer side surfaces toward lower outer sides.

The elastic members 4, preferably identical in width to the holding plates 2, can also be formed with a different width from the holding plates 2, in response to the object and the application thereof. In this case, the ratio between the widths of the elastic members 4 and the holding plates 2 is preferably in the range of from 1:2 to 2:1.

While the respective elastic members 4 incline from the outer side surfaces of the respective holding plates 2 downwardly toward the lower outer sides in FIG. 7, the same can also be provided to be generally L-shaped in front sectional view, to temporarily extend outward from the outer side surfaces of the respective holding plates 2 and to thereafter extend downward, for example.

Free end portions of the respective elastic members 4 protrude downward (toward the one side) away from the set surface 10 of the base plate 3, in a state where the pair of holding plates 2 hold the component 21 therebetween.

The elastic members 4 include base portions 14 coupled to the outer side surfaces of the holding plates 2 and free end portions 15 coupled to the base portions 14.

The base portions 14 are relatively nonflexible, i.e., hard, and formed as about ¾ the lengths of the elastic members 4 closer to the sides of base ends.

The free end portions 15 are formed to be thinner than the base portions 14, relatively flexible, i.e., soft, and formed as about ¼ the lengths of the elastic members 4 closer to the sides of free ends. The free end portions 15 are provided to spread outward beyond the base portions 14, whereby the free end portions 15 can be deflected in the vertical direction by bending outward with respect to the base portions 14.

The mooring member 5 has rigidity, is provided to be moored to the panel 22, and includes an insertional portion 16 inserted into a mooring hole 23 of the panel 22 and hook portions 17 provided on free end portions of the insertional portion 16.

The insertional portion 16 is formed in a protruding plate shape or a shaft shape, and provided to protrude from the horizontal and anteroposterior center in the set surface 10 of the base plate 3 downward past the panel 22.

Two hook portions 17 are provided to protrude from the free end portions of the insertional portion 16 in the horizontal direction (or the anteroposterior direction, although not shown) orthogonal to an insertional direction of the insertional portion 16, and more specifically, two hook portions 17 are provided to sandwich the free end portions of the insertional portion 16 from left and right (or front and behind, although not shown), while each hook portion 17 protrudes from the free end portion of the insertional portion 16, so that it can be bent upward, and has flexibility in directions towards and away from the insertional portion 16. Each hook portion 17 ordinarily moves away from the insertional portion 16, due to elastic force thereof.

A method of fixing the component 21 to the panel 22 with the clip 1 is now described with reference to FIGS. 7 to 9.

The component 21, varying with the object and the application thereof and not particularly restricted, is made of an elastically deformable rubber material or a foam material, for example, and more specifically, the same is formed into a generally rectangular flat plate shape from a foam material (described later). A through hole (not shown) passable by the fitting pawl 12 is formed in the component 21.

The panel 22 is part of a structure utilizable in various industrial fields, and perforated with the mooring hole 23 circular in plan view, to which the clip 1 is moored.

In order to fix the component 21 to the panel 22, the pair of holding plates 2 are first pivoted away from one another about hinges 11, with respect to the base plate 3 while the component 21 is inserted between the holding plates 2 so that the longitudinal direction of the component 21 is along the vertical direction, and the lower end portion of the component 21 is set on the upper surface of the base plate 3, as shown in FIG. 8.

Then, the pair of holding plates 2 are pivoted in the holding direction with respect to the base plate 3 towards one another, and the component 21 is held by the pair of holding plates 2, as shown in FIG. 9. At this time, the pawl 19 of the fitting pawl 12 passes through the through-hole of the component 21 to fit with the fitting receiving portion 13, and a holding state of the pair of holding plates 2 is retained.

Thus, the component 21 is mounted on the clip 1, and an elastic body attachment component P including the component 21 and the clip 1 holding the component 21 has been prepared.

Then, the mooring member 5 is moored to the panel 22, as shown in FIG. 7. More specifically, the mooring member 5 is pushed into the mooring hole 23. This causes the hook portions 17 to be pressed towards the insertional portion 16 into the mooring hole 23 of the panel 22 until the set surface 10 of the base plate 3 is set on the upper surface of the panel 22, and thereafter pressure is released from the mooring member 5. At this point, the hook portions 17 move away from the insertional portion 16 due to elastic force thereof, and free end portions of the hook portions 17 come into contact with the lower surface of the panel 22, whereby the mooring member 5 is moored to the panel 22.

Thus, the clip 1 is fixed to the panel 22 by holding the panel 22 between the set surface 10 of the base plate 3 and the free end portions of the hook portions 17 while holding the component 21 with the pair of holding plates 2, and the component 21 is fixed to the panel 22 with the clip 1.

When setting the base plate 3 on the panel 22 in the clip 1, the free end portions 15 of the elastic members 4 protruding outwardly beyond the base plate 3 come into contact with the panel 22 and receive upward reaction force. Then, the flexible free end portions 15 are deflected due to the reaction force, whereby elastic force resulting from the deflection is transmitted to the holding plates 2 through the nonflexible base portions 14. Then, due to such reaction force, both holding plates 2 pivot with respect to the base plate 3 in a direction towards one another for holding the component 21 therebetween. Thus, the component 21 is held by the pair of holding plates 2. So far as the base plate 3 is set on the panel 22, the reaction force is continuously applied to both holding plates 2 from the elastic members 4, whereby such a clip 1 can continuously retain the component 21 with a simple structure. In other words, the elastic body attachment component P can continuously retain the component 21 with a simple structure.

Particularly in the clip 1, the respective elastic members 4 are provided on both holding plates 2, whereby the component 21 can be firmly held by holding force from both of the pair of holding plates 2.

In the elastic members 4, further, the flexible free end portions 15 come into contact with the panel 22 and are deflected due to the reaction force, whereby the elastic force resulting from the deflection is transmitted to the holding plates 2 through the nonflexible base portions 14. Therefore, the reaction force received by the elastic members 4 can be securely transmitted to the holding plates 2, and holding of the component 21 with the holding plates 2 can be reliably attained.

In the clip 1, the base plate 3 can be firmly set on the panel 22 by mooring the mooring member 5 to the panel 22. Therefore, the component 21 can be firmly fixed to the panel 22.

In the mooring member 5, further, the insertional portion 16 is inserted into the mooring hole 23 of the panel 22, while the hook portions 17 provided on the free end portions thereof can be moored against the lower surface of the panel 22. Therefore, the mooring member 5 can be reliably moored to the panel 22.

In such an elastic body attachment component P, therefore, the clip 1 can be fixed to the panel 22 while continuously holding the component 21, whereby, even if the component 21 is a foam material (a foam body) deteriorating over time, such that repulsive force lowers, both holding plates 2 so hold the foam material following the lowering of the repulsive force that the foam material can be stably retained.

In such an elastic body attachment component P, therefore, the clip 1 is preferably employed for fixing a foam body (hereinafter referred to as a foam body for filling) for filling up a clearance in members or an internal space of a hollow member as the component 21.

Figure 10:
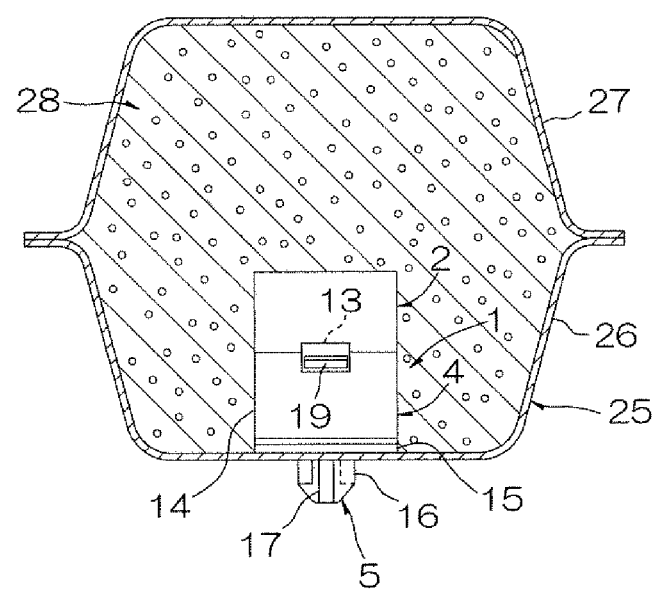
FIG. 10 is a sectional view showing an embodiment in which a foam body for filling is fixed to an internal space of a pillar through the clip shown in FIG. 7.

FIG. 10 is a sectional view showing such an embodiment that a foam body for filling is fixed to an internal space of a pillar through the clip shown in FIG. 7.

As FIG. 10 is referred to, for example, the clip 1 is employed for filling up an internal space of a hollow member formed as a closed section such as a pillar 25 of an automobile with a foam body 28 for filling for preventing vibration or noise of the engine, wind noise or the like from being transmitted into the automobile cabin in the elastic body attachment component P.

The foam body 28 for filling is a foam body (a foam material) formed by vulcanizing/foaming a mixture containing ethylene-propylene-diene rubber, a vulcanizer and a foaming agent, for example.

In order to fill up the internal space of the pillar 25 with the foam body 28 for filling, the clip 1 mounted with the foam body 28 for filling in a way similar to the way the component 21 is set in the pillar 25, as hereinabove described. More specifically, the clip 1 mounted with the foam body 28 for filling is fixed to an inner panel 26 as a panel 22, as was previously described with reference to FIG. 7.

The pillar 25 includes the inner panel 26 and an outer panel 27 generally concaved in section, and is formed as the closed section by bonding both end portions of the inner panel 26 and the outer panel 27 by welding after setting the foam body 28 for filling on the inner panel 26. More specifically, such a pillar 2 may be a front pillar, a side pillar or a rear pillar of the automobile.

In the elastic body attachment component P, the clip 1 is also employed for fixing the component 21 in which a composition for foaming/filling before foaming is formed in a sheet shape to the internal space of the pillar 25, and thereafter forming the foam body 28 for filling by foaming the component 21 and filling up the internal space of the pillar 25 with the foam body 28 for filling.

FIG. 11 is a step-by-step diagram of still another embodiment of a method of filling up an internal space of a pillar of an automobile with a foam body for filling, while (a) shows a step of setting a clip mounted with a composition for foaming/filling in the internal space of the pillar, and (b) shows a step of filling up the internal space of the pillar with the foam body for filling by foaming, crosslinking and curing the composition for foaming/filling by heating.

This embodiment of the method of filling up the internal space of the pillar of the automobile with the foam body for filling is now described with reference to FIG. 11.

In this method, a clip 1 mounted with a component 21 in which a composition for foaming/filling before foaming is formed in a sheet shape, i.e., an elastic body attachment component P, is prepared as shown in FIG. 11(a), as previously described with respect to FIG. 9.

The component 21 is formed from a composition for foaming/filling foamable, crosslinkable and curable by heating, and such a composition for foaming/filling can be prepared by molding a well-known composition for foaming/filling (the composition for foaming/filling described in Japanese Unexamined Patent Publication No. 2007-314755, for example) containing a polymer and a foaming agent or the like into a sheet shape.

In the composition for foaming/filling, the volume expansion ratio (density before foaming/density after foaming) at the time of foaming is not less than two, for example, and preferably not less than 10.

According to this method, the clip 1 mounted with the component 21 is set in a pillar 25, as shown in FIG. 11(a). More specifically, the clip 1 mounted with the component 21 made of the composition for foaming/filling is fixed to an inner panel 26, and was assembled as previously described with respect to FIG. 7.

The pillar 25 includes the inner panel 26 and an outer panel 27 generally concave in section, and is formed as the closed section by bonding both end portions of the inner panel 26 and the outer panel 27 by welding after setting the component 21 on the inner panel 26. More specifically, such a pillar 2 may be a front pillar, a side pillar or a rear pillar of the automobile.

Thereafter in this embodiment of the method according to the present invention, the pillar 25 is heated at a temperature of not less than 140° C. and not more than 180° C., for example, and preferably not less than 160° C. and not more than 180° C., by utilizing heat in a drying line step at a time of a subsequent baking finish. Thus, a foam body 28 (a foam material) for filling can be formed as shown in FIG. 11(b), and the internal space of the pillar 25 can be substantially closely filled up with the foam body 28 for filling.

The shape, a set position, an arrangement direction, an arrangement number etc. of the component 21 may be properly selected in response to the shape of the pillar 25 or the like.

Figure 12:
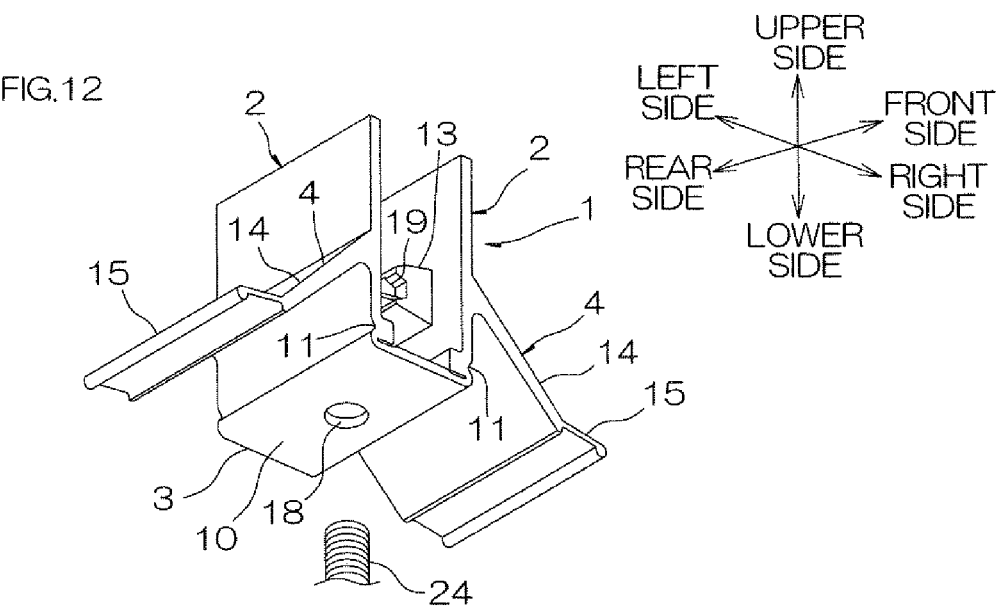
FIG. 12 shows a perspective view of a fourth embodiment of the clip according to the present invention (in which a clip is not provided with a mooring member, but a panel is provided with a screw).

While the mooring member 5 is integrally provided along with the base plate 3 in the clip 1 in the above description, the mooring member 5 may be attached to the base plate 3 as a separate component, and a component capable of mooring the clip 1 can be provided on the panel 22 as shown in FIG. 12, without providing the mooring member 5 on the clip 1.

FIG. 12 shows a perspective view of a further embodiment (a clip not being provided with a mooring member, but a panel is provided with a screw) of the clip according to the present invention.

In other words, a base plate 3 is perforated with a threaded hole 18 in which a thread groove is formed while a panel 2 is provided with a screw 24 fastenable to the threaded hole 18 without providing the mooring member 5 on the clip 1, as shown in FIG. 12.

When fastening the screw 24 of the panel 22 to the threaded hole 18 of the base plate 3, effects similar to the above can be attained. Further, the clip 1 may not be provided with the mooring member 5, and reduction of the cost for the clip 1 can be attained.

Figure 13:
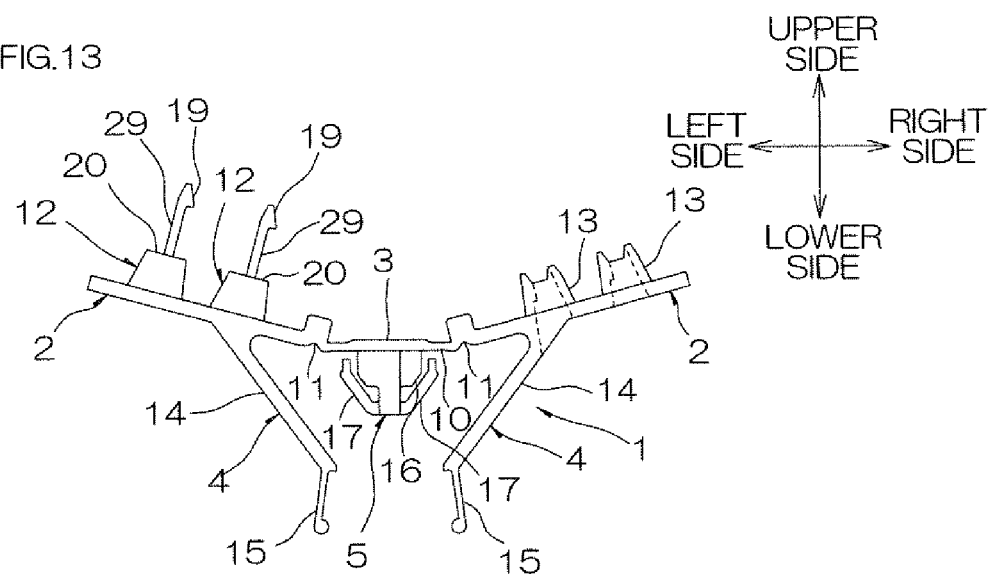
FIG. 13 shows a front elevational view of a fifth embodiment of the clip according to the present invention (plural fitting pawls and fitted portions).

While one fitting pawl 12 and one fitting receiving portion 13 have been provided respectively as the fitting member and the fitted member in the above description, fitting pawls 12 and fitting receiving portions 13 may be plurally provided respectively, as shown in FIG. 13.

FIG. 13 shows a front elevational view of yet a further embodiment (such that fitting pawls and fitted portions are plurally present) of the clip according to the present invention.

In other words, two fitting pawls 12 are vertically provided on a left holding plate 2 and two fitting receiving portions 13 are vertically provided on a right holding plate 2 in the clip 1, as shown in FIG. 13. In a holding state of the holding plates 2, the respective fitting pawls 12 fit with the respective fitting receiving portions 13.

A component 21 can be more reliably held by plurally providing the fitting pawls 12 and the fitting receiving portions 13 respectively.

In a fitting pawl 12, pawls 19 can also be plurally provided at an interval in a protruding direction.

Figure 14:
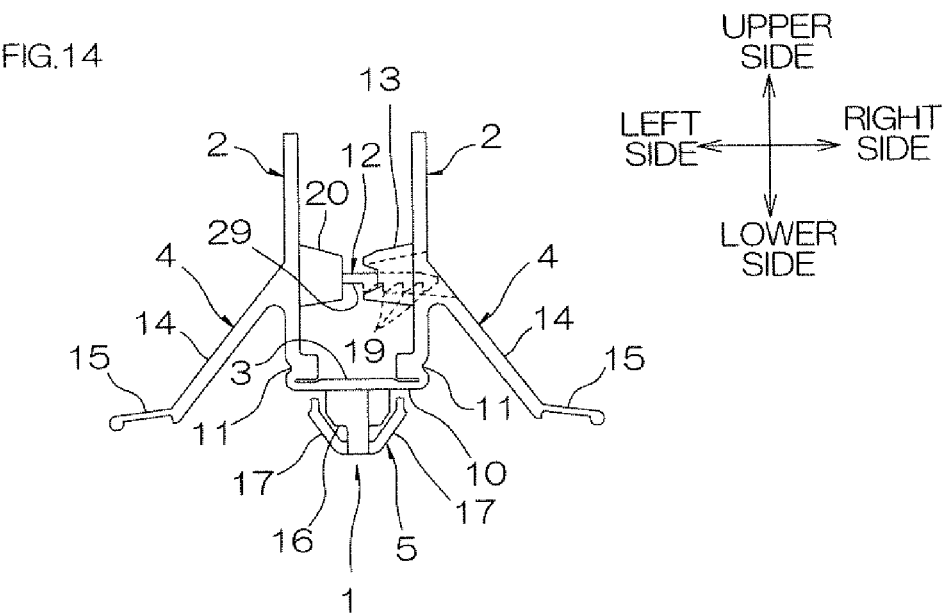
FIG. 14 shows a front elevational view of a sixth embodiment of the clip according to the present invention (plural pawls).

FIG. 14 shows a front elevational view of another embodiment (such that pawls are plurally provided) of the clip according to the present invention.

In other words, pawls 19 are plurally provided at an interval in a protruding direction of a fitting pawl 12 to be fittable with a fitting receiving portion 13 in a multistage manner in order to adjust a holding interval between holding plates 2, as shown in FIG. 14.

Thus, the holding interval between the pair of holding plates 2 can be adjusted, whereby a component 21 can be more reliably held correspondingly thereto.

Figure 15:
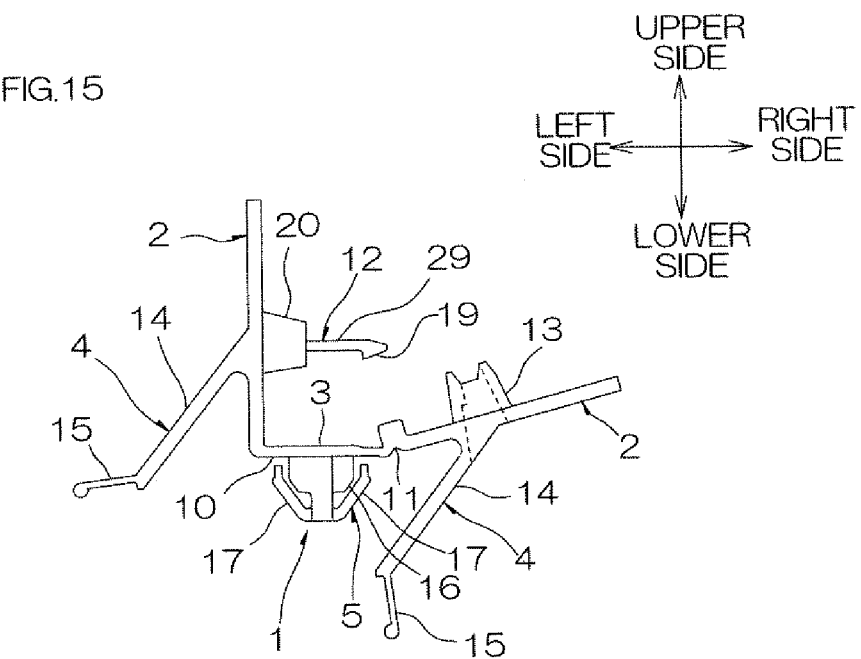
FIG. 15 shows a front elevational view of a seventh embodiment of the clip according to the present invention (holding plates are single-hinged).

While the pair of holding plates 2 are coupled to the base plate 3 to be double-hingeable in the above description, a pair of holding plates 2 can also be coupled to a base plate 3 to be single-hingeable, as shown in FIG. 15.

FIG. 15 shows a front elevational view of still another embodiment (such that holding plates are single-hinged) of the clip according to the present invention.

In other words, a pair of holding plates 2 are coupled to a base plate 3 to be single-hingeable, by fixedly coupling one side (for example, the left) holding plate 2 to the base plate 3 while pivotably coupling the other side (for example, the right) holding plate 2 to the base plate 3 in the pair of holding plates 2, in the clip 1 shown in FIG. 15.

Additional effects similar to the above can be attained also by the clip 1.

The aforementioned various embodiments can also be properly employed in combination in response to various other necessities and applications, although not shown in detail.

While the illustrative embodiments of the present invention are provided in the above description, such is for illustrative purpose only and they are not to be construed as limiting the scope of the present invention. Modifications and variations of the present invention will be apparent to those skilled in the art that are within the spirit and scope of the invention as defined in the appended claims.

INDUSTRIAL APPLICABILITY

The clip and the elastic body attachment component according to the present invention are effectively employed for continuously retaining an elastic body employed for various industrial products.

What is claimed is:
1. A clip comprising:
a pair of holding members arranged oppositely to each other to be capable of holding an elastic body therebetween;
a base member, to which end portions of one side of the pair of holding members are coupled, being set on an object to be fixed;
at least one of the holding members being pivotably coupled to the base member,
pressing members provided on the holding members for retaining the elastic body between the pair of holding members,
wherein the pressing members are provided as a pair on each of the holding members, a pressing member being disposed on one side of each holding member and the other pressing member being disposed on the other side of each holding member,
wherein the respective pressing members provided on the one side of the holding members are angled toward the other side of the holding members,
wherein the respective pressing members provided on the other side of the holding members are angled toward the one side of the holding members, whereby:
the pair of pressing members on the one side of the holding members and the pair of pressing members on the other side of the holding members retain the elastic body pressed between the pair of holding members,
the pair of holding members are spaced apart in an opposed direction; and
the pair of pressing members are spaced apart a predetermined distance in a direction orthogonal to the opposed direction of the pair of holding members,
wherein the holding members include pedestal portions and pressure contact portions,
wherein the pedestal portions are thick plates relative to the pressing members and coupled to the base member,
wherein the pressure contact portions are thick plates relative to the pressing members and extend in a direction opposite to the base member with respect to the pedestal portions, and
wherein the pressing members are thin plates relative to the pedestal portions and the pressure contact portions and provided on the pressure contact portions.
2. The clip according to claim 1, wherein
a fitting member is provided on the one side of the holding members while a fitted member is provided on another side of the holding members, whereby
the pair of holding members are retained in a holding state by the fitting engagement of the fitting member with the fitted member.
3. The clip according to claim 1, wherein
the holding members are formed in plate shapes.
4. The clip according to claim 1, wherein
the pair of holding members and the base member are integrally molded from a resin material, and
a coupling portion between at least the pivotably coupled one of the holding members and the base member includes a hinge at which the resin material is thinner than the base member and the pivotably coupled one of the holding members.
5. The clip according to claim 1, further comprising a mooring member protruding from the base member toward the one side to be moored to the object to be fixed.

6. The clip according to claim 5, wherein
the mooring member includes an insertional portion extending from the base member in an insertional direction and inserted into the object to be fixed, and
a hook portion provided on a free end portion of the insertional portion and extending in a direction orthogonal to the insertional direction of the insertional portion.

7. The clip according to claim 1, wherein
the fitting member and the fitted member are provided on the pressure contact portions.

8. The clip according to claim 1, wherein
the pressing members are formed in flexible plate shapes.

9. The clip according to claim 1, further comprising an elastic member provided on at least one of the holding members and protruding toward the one side beyond the base member.

10. The clip according to claim 9, wherein
respective elastic members are provided on both of the holding members.

11. The clip according to claim 9, wherein
the elastic member includes:
a nonflexible base portion coupled to the holding members, and
a flexible free end portion coupled to the base portion.

* * * * *